United States Patent [19]

Rogers

[11] Patent Number: 4,726,093
[45] Date of Patent: Feb. 23, 1988

[54] FOOD PRODUCT MANUFACTURE

[75] Inventor: Kenneth J. Rogers, High Wycombe, England

[73] Assignee: United Biscuits (UK) Limited, Middlesex, England

[21] Appl. No.: 800,498

[22] Filed: Nov. 21, 1985

[30] Foreign Application Priority Data

Nov. 26, 1984 [GB] United Kingdom ............... 8429847

[51] Int. Cl.$^4$ ............................................ A22C 11/00
[52] U.S. Cl. ........................................ 17/1 F; 17/32; 17/33; 17/49
[58] Field of Search ................. 17/1 F, 24, 32, 33; 99/349, 384, 353, 373, 361, 362, 470; 198/727

[56] References Cited

U.S. PATENT DOCUMENTS

| | | | |
|---|---|---|---|
| 2,070,850 | 2/1937 | Trabold | 99/349 |
| 2,542,673 | 2/1951 | Hedwall | 17/34 |
| 2,685,518 | 8/1954 | Prohaska | 17/1 F UX |
| 2,933,758 | 4/1960 | Moule | 17/32 |
| 3,282,405 | 11/1966 | Larson et al. | 198/727 X |
| 3,421,434 | 1/1969 | Krachmer | 99/352 |
| 3,502,018 | 3/1970 | Keszler | 99/355 |
| 3,586,155 | 6/1971 | Turrentine et al. | 198/727 X |
| 3,961,569 | 6/1976 | Kenyon et al. | 99/470 X |
| 4,090,275 | 5/1978 | Jorgensen et al. | 17/24 |
| 4,113,890 | 10/1978 | Long | 426/512 |
| 4,379,356 | 4/1983 | Geissbühler | 17/1 F X |

FOREIGN PATENT DOCUMENTS

| | | |
|---|---|---|
| 891175 | 3/1962 | United Kingdom . |
| 1145515 | 3/1969 | United Kingdom . |
| 736929 | 5/1980 | U.S.S.R. ............... 17/1 F |

Primary Examiner—Willie G. Abercrombie
Attorney, Agent, or Firm—Seidel, Gonda, Goldhammer & Abbott

[57] ABSTRACT

An apparatus (FIGS. 3 to 7) for manufacturing food products such as skinless sausages comprises a tube which contains a plurality of plugs strung along a wire. The plugs are shaped to define sausage end shapes and spaced to define sausage-shaped compartments for filling with sausage-forming material. The plugs and wire are driven through the tube by a motor-driven sprocket which has peripheral recesses for reception of the plugs. Between the recesses the sprocket periphery has slots for receiving the wire. The contents of the tube are cooked by being heated and then cooled by suitable fluid jackets around the tube, or otherwise. In other embodiments, a flexible tube is pinched to form sausage compartments which are moved peristaltically (FIGS. 1 and 2) and a belt having partition-forming formations is rolled within the tube (FIGS. 8 to 11).

52 Claims, 11 Drawing Figures

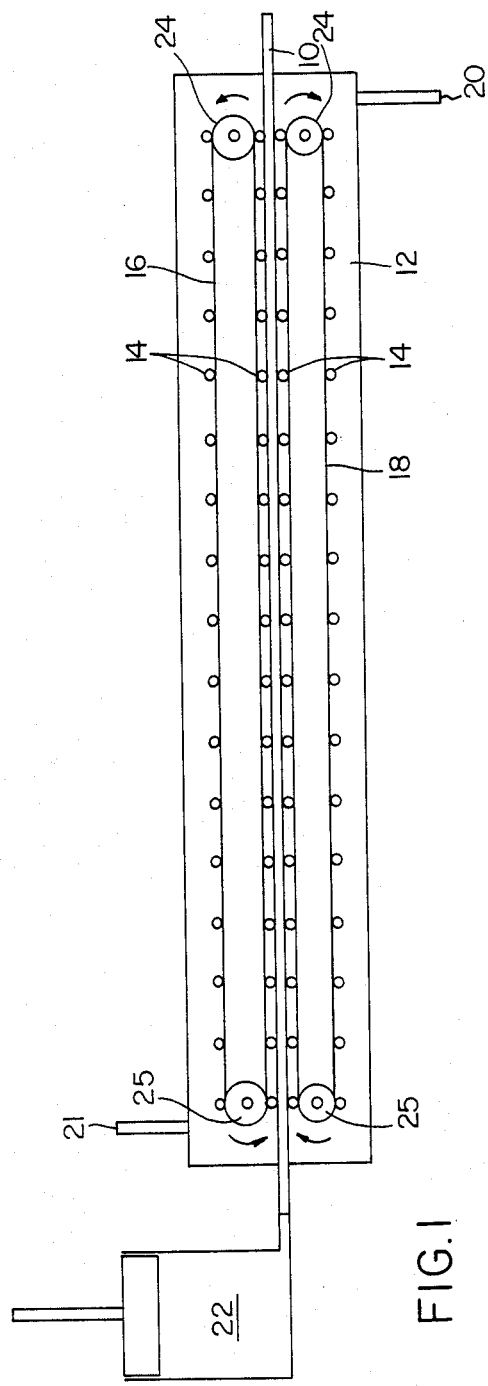
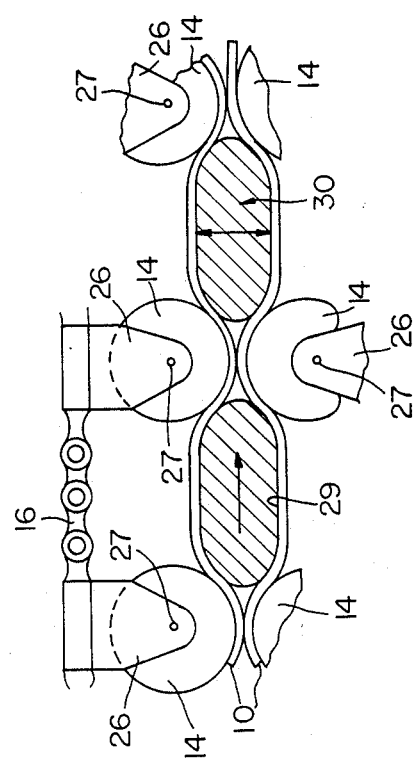

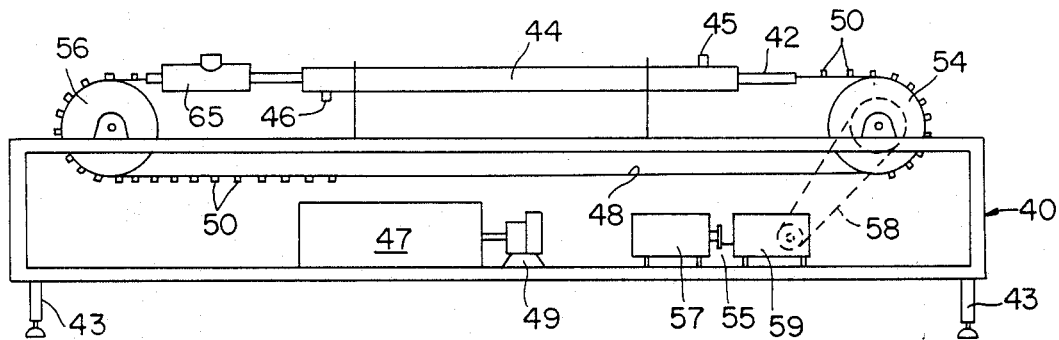
FIG.3
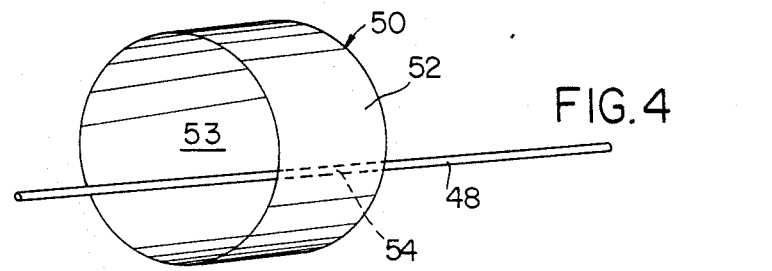
FIG.4
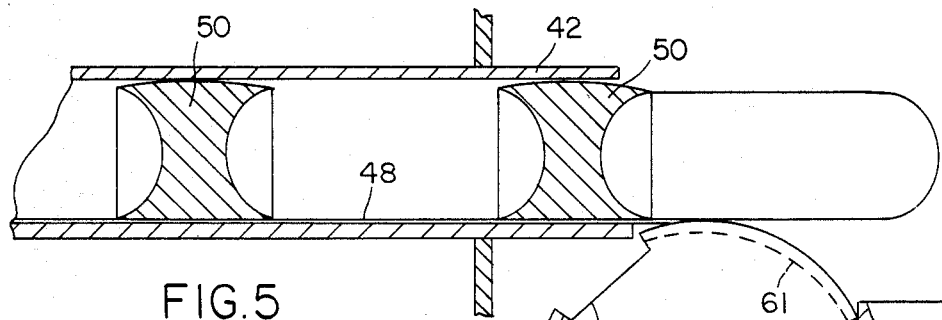
FIG.5
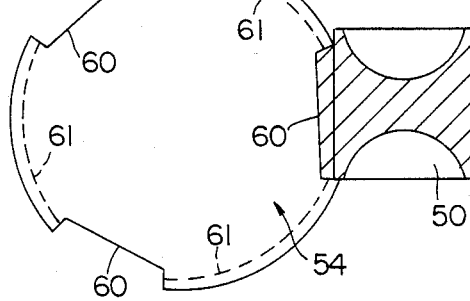
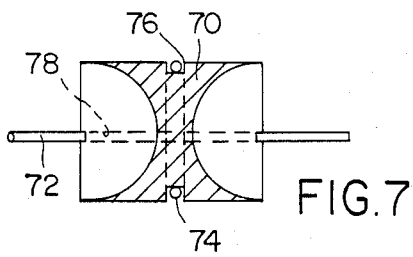
FIG.6
FIG.7

FOOD PRODUCT MANUFACTURE

BACKGROUND TO THE INVENTION

1. Field of the Invention

This invention relats to the manufacture of food products, for example skinless sausages.

2. Description of the Prior Art

In the past, skinless sausages have been made by a process which includes the steps of cooking a sausage having a skin, slitting the skin of the cooked sausage at both sides of the sausage and removing and discarding the sausage skin. This process is time-consuming and, because the skins are discarded after slitting and removal, also wasteful. Another known method for the manufacture of skinless sausages includes the cooking of sausage meat into a continuous "rope" which is subsequently cut into sausage-sized portions. This method has the disadvantage that it tends not to produce sausages of satisfactory shape, particularly as regards the shape of the end of the sausage. A third known method of skinless sausage manufacture involves chemical surfachardening of sausage-shaped portions of sausage meat prior to cooking.

The present invention has as one object to provide apparatus by which skinless sausages can be manufactured quickly and economically. Apparatus according to the invention is however also suitable for the manufacture of other food products. Skinless sausages made by the apparatus may be of any size, for example a size within the diamater : length ratio range of from 1:1 to 1:20. Thus, the sausages may be of the kind which is sold in tins mixed with, for example, baked beans but may also be, for example, frankfurter- or pepperoni-type products.

It is a further object of the present invention to provide an apparatus for processing food product forming material, in which the material is processed in a tube which contains the material in elongate compartments bound, at least in part, directly by the interior surface of the tube wall.

It is another object to provide an apparatus which can manufacture skinless sausages or other sausage-shaped food products of highly uniform shape, appearance and weight.

It is yet another object to provide an apparatus which can manufacture skinless sausages or other sausage-shaped food in microbiologically clean and hygenic conditions and which can be operated in this way for long periods in a commercial situation.

A still further object of the invention is to provide a skinless sausage or other such shaped food product manufacturing apparatus which is cleaned and maintained in a microbiologically acceptable condition automatically during its operation.

SUMMARY OF THE INVENTION

The invention provides an apparatus for the processing of a food product-forming material, comprising a tube in which the material is processed, means for forming in an end-to-end arrangement in the tube a plurality of spaced-apart zones to be occupied by the material and for moving material occupying the zones successively from an inlet of the tube to an outlet, and means for introducing the material into the zones adjacent the inlet of the tube, the zones extending longitudinally of the tube and being bounded longitudinally at least in part by the inner surface of the tube wall.

Thus, in such apparatus, the food product-forming material occupies zones inside the tube and the inner surface of the tube wall remains stationary as the material moves relative thereto.

The processing carried out may involve no treatment by external agents or means and can thus be, for example a simple forming or setting operation. However, the product is conveniently treated and according to the nature of the desired treatment, the material in the tube may be, for example, heated and then cooled (for example by heating or cooling jackets) whilst passing through successive tube portions, heated to different temperatures in successive portions, etc. Heating of the material may be effected by irradiation by electromagnetic radiation, for example microwave radiation. Instead of or in addition to heating and/or cooling the material may be treated by other forms of radiation. The invention is particularly applicable to the manufacture of skinless sausages and, accordingly, also provides an apparatus for the manufacture of skinless sausages, comprising a tube in which the sausages are formed, means for forming within the tube a plurality of elongate sausage compartments and for moving the compartments successively from an inlet of the tube to an outlet, and means for introducing sausage material into the compartments adjacent the inlet of the tube, the compartments extending axially of the tube in end-to-end relationship one with another and being bounded longitudinally at least in part by the inner surface of the tube wall.

The sausage tube may be heated over an upstream portion only or over its entire length. A downstream portion of the tube is however advantageously cooled to solidify fat contained in the sausage material and thus facilitate removal of the sausages from the apparatus and ensure that sausages of a desired shape and weight are obtained reliably.

More preferably, the sausage-forming tube has at least one intermediate temperature portion between the cooking and the cooling portions.

In one form of the present invention, the tube has flexible walls and the means for forming and moving the food material zones or sausage compartments comprise respective series of pressure elements on opposed sides of the tube, the pressure elements acting in pairs to pinch the tube walls together and form the zones or compartments within the tube, and the pressure elements being movable along the tube in order to move sausage or other food material in the zones or compartments along the tube by peristaltic action.

The invention also provides an apparatus for the processing of a food product-forming material, comprising a flexible-walled tube in which the material is processed, means for forming in an end-to-end arrangement in the tube a plurality of spaced-apart longitudinally-extending zones to be occupied by the material and for moving material occupying the zones successively from an inlet of the tube to an outlet, and means for introducing the material into the zones adjacent the inlet of the tube, the forming and moving means comprising respective series of pressure elements on opposed sides of the tube, the pressure elements acting in pairs to pinch the tube walls together and form the zones within the tube, and the pressure elements being movable along the tube in order to move sausage or other food material in the zones along the tube by peristaltic action.

Conveniently, each series of pressure elements acting on the tube is formed by a run of a respective endless member, such as a belt or chain, carrying such pressure elements and in engagement with drive means for driving the elements along the tube.

Advantageously, the tube, or the heated portion or portions thereof, and the corresponding pressure elements are enclosed in a chamber having inlet and outlet ports by way of which steam for heating the tube or tube portion(s) can be fed.

In another form of the invention, the means for forming and moving the food material zones or sausage compartments comprise a source of compressed air, or other gas, which is arranged to introduced pockets of air or gas under pressure into the tube alternately with food or product material introduced by the material-introduction means, the food product material being driven along the tube to its outlet end by expansion of the gas introduced into the tube.

In yet another form of the invention, the means for forming and moving the zones or compartments comprise an elongate element on which spaced-apart partitioning means are mounted, the elongate element being receivable within the tube where the partitioning means then form a series of zones or compartments inside the tube, and drive means for driving the elongate element and partitioning means through the tube.

Moreover, the invention also provides an apparatus for the processing of a food product-forming material, comprising a tube in which the material is processed, spaced-apart partitioning means dividing the interior of the tube into a plurality of elongate compartments extending axially of the tube in end-to-end relationship one with another, the partitioning means being mounted at spaced intervals along an elongate element which is received in the tube and which occupies the same cross-section area of the tube as the elongate compartments, means for introducing the material into the tube adjacent an inlet thereof and drive means for driving the elongate element and partitioning means through the tube.

In these latter three forms of the invention the tube walls may be, but need not be, rigid.

The elongate element is preferably endless and its partitionng means can then be driven continuously through the tube. With such an arrangement, a return run of the endless element advantageously passes through a cleaning chamber, for example a further tube or elongate duct, in which the endless element and partitioning means are cleaned and, preferably, sterilised. The cleaning chamber thus contains cleaning means which may comprise a device for spraying cleaning or sterilising liquids onto the endless element and partitioning means or, in other embodiments, the cleaning means may be arranged for immersion of the endless element and partitioning means in a cleaning or sterilising liquid. Cleaning and/or sterilising may take place continuously during operation of the apparatus, or may take place only periodically, for example at shut-down of the apparatus.

The elongate element may be a wire or tape, for example of stainless steel or a suitable plastics material, carrying a plurality of partitioning elements each shaped in cross-section to correspond to the internal cross-section of the tube and, when sausages are to be produced, having end faces which are concave and shaped to correspond to the desired end shapes of the sausages. Advantageously, the end faces also have a set of approximately-radial grooves which give the appearance of a twisted sausage skin in a skinless sausage produced by the apparatus.

In one advantageous form of the invention, the drive means comprise a sprocket driven by motor means and shaped to engage the partitioning means.

Preferably, the periphery of the sprocket has a plurality of recesses into which respective partitioning means are received for engagement with the sprocket.

More preferably, peripheral portions of the sprocket between the recesses have slots for reception of the elongate element.

In yet another aspect, the invention provides an apparatus for the processing of a food product-forming material, comprising a tube in which the material is processed and a flexible strip of width at least equal to the internal circumference of the tube, the strip having at points spaced along its length transversely-extending rows of upstanding formations which are shaped to co-operate one with another when the belt is rolled inside the tube to form partitions extending across the interior of the tube and defining a plurality of elongate compartments extending axially of the tube in end-to-end relationship one with another, the apparatus including drive means for driving the belt through the tube, means for introducing the material into the compartments adjacent an inlet of the tube and means for un-rolling the flexible strip as it leaves the tube. When sausages are to be made, the formations are shaped so that the sausage compartments have at each end a concave recess corresponding to a desired sausage end shape.

With such an elongate element, the flexible strip is un-rolled as it leaves the tube and this un-rolling facilitates removal of the cooked sausages. If necessary a suitably-shaped shoe engaging the strip can assist in its un-rolling. To facilitate cleaning of the flexible strip, means may be provided whereby a return run of the strip is rolled with a curvature opposite to that with which it is rolled in the tube.

In apparatus according to the invention in which the tube is acted upon peristaltically, the tube, or the heated portion or portions and the corresponding pressure elements may be enclosed in a chamber have inlet and outlet ports by way of which steam for heating the tube or tube portion(s) can be fed.

In forms of the apparatus in which the tube is not acted upon by external pressure elements, the tube can have one or more jackets through which water or oil, or other liquids or gases, at appropriate temperatures for cooking or cooling can be passed from appropriate sources.

In other embodiments of the invention, the heating of the food material is by microwaves and, in such embodiments the tube formed from a suitable plastics or glass material, such as borosilicate glass.

Satisfactory cooking of skinless sausages has been obtained by use of a heating medium at about 120° C., for example oil, for the cooking tube or tube portion and a cooling medium, for example water, at 2° to 4° C. for the cooling portion of the tube. The melting of fat in the sausage meat has been found to lubricate the interior of the tube. However, with other food products, heating to temperatures in the range of from 90° to 200° C. may be appropriate.

In cooking skinless sausages, the total residence time of the material in the tube is conveniently of the order of 3 minutes when the above temperatures are used. The sausages are conveniently cooled during about the final third of their residence time in the tube.

The food material may be introduced into the tube by use of a constant pressure feed system, for example one comprising a piston and cylinder or a screw arrangement. Advantageously, the means for introducing food material includes a mixing device, for example a static mixer, for ensuring thorough mixing of the food material. Such a static mixer may be aligned with the tube, or positioned otherwise. When food product zone- or compartment-formation takes place peristaltically, the introduction means will be connected directly to the inlet end of the tube. In embodiments which include the said partitioning means, the elongate element advantageously extends through a tubular portion of the feed system forming an extension of the cooking tube and having a side-entry through which the food material is introduced into the compartments. In these embodiments the pressure feed system is advantageously pulsed so that pressure is applied only when the feed product zones or compartments are in register with the feed system outlet. This arrangement reduces the possibility of the excess strain on the elongate element leading to deterioration or breakage of the elongate element. When the elongate element is to be rolled in the tube, the final stage of rolling is arranged to take place after filling of the compartments.

BRIEF DESCRIPTION OF THE DRAWINGS

Three embodiments of the invention will now be described by way of example with reference to the drawings, in which:

FIG. 1 is a schematic side view, partly in section, of an apparatus for manufacturing skinless sausages, FIG. 2 shows a portion of FIG. 1 on an enlarged scale, FIG. 3 is a schematic side view of another apparatus for manufacturing skinless sausages, FIG. 4 is a perspective view of a part of the apparatus of FIG. 3, FIG. 5 is a longitudinal section through a portion of the apparatus of FIG. 3, FIG. 6 is a perspective view of a portion of a modified version of the apparatus of FIG. 3, FIG. 7 is a sectional view of part of the apparatus of FIG. 6.

DETAILED DESCRIPTION OF PREFERRED EMBODIMENTS

Figure 8:
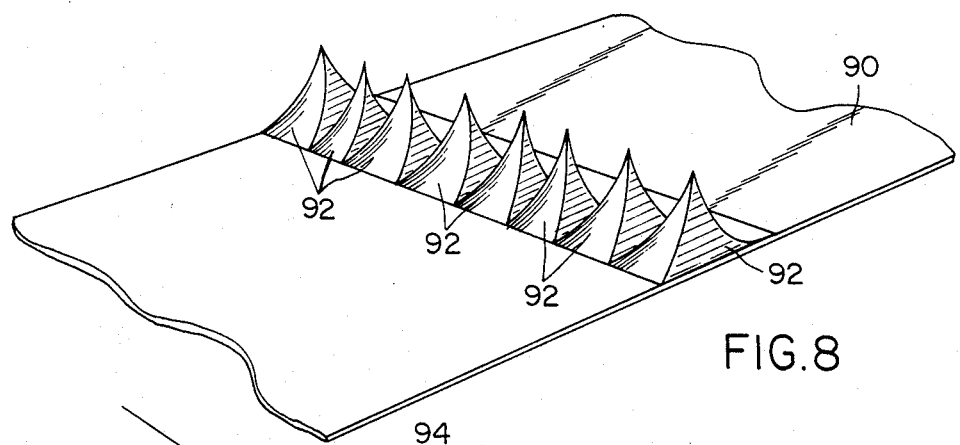
FIG. 8 is a perspective view of a portion of a compartment-forming belt of a third apparatus for manufacturing skinless sausages.

The apparatus of FIG. 1 has a silicone rubber tube 10 of 16 mm internal diameter and about 2 m in length supported within a stream chamber 12 by pressure elements in the form of rollers 14 carried on upper and lower endless chains 16, 18. The chamber 12 has an inlet 20, connected to a suitable source of steam, and an outlet 21. A constant-pressure feed apparatus 22 of the piston and cylinder type is connected to the inlet end of the tube 10 (the left-hand end in FIG. 1), so that sausage meat under pressure can be fed into the tube.

The endless chains 16, 18 are each in engagement with a drive sprocket 24, adjacent the output end of the tube, and a guide sprocket 25 adjacent the input end of the tube. The sprockets 24, 25 guide respective runs of the chains 16, 18 to extend close to the tube 10 and parallel to the axis thereof. Resilient biasing means (not shown) bias the rollers 14 against the tube 10.

The rollers 14 are spaced at equal intervals along the chains 16, 18 and are shown in more detail in FIG. 2. It will be seen from this figure that the rollers are attached to the chains 16, 18 by brackets 26 in which the rollers are rotatable on axles 27. The circumferential surfaces of the rollers have arcuate grooves forming surfaces between which the tube is pinched. As shown in FIG. 2, the rollers 14 act on the tube in opposed pairs to compress the wall of the tube and form within it a plurality of elongate compartments 29 which are filed with sausage meat 30 by the feed apparatus 22. The drive sprockets 24 are rotated by a suitable drive means, such as an electric motor, in the direction shown by the arrows on FIG. 1. When the sprockets 24 are so rotated, the chains 16, 18 move the rollers 14 of the chain runs adjacent the tube 10 in the direction of the outlet end of the tube 10. This movement causes a peristaltic action of the rollers 14 on the tube 10 and the sausage compartments 29 containing the meat 30 are moved along the tube from the inlet end to the outlet end. During this movement, the sausages are cooked in the heat of the steam.

In further modified versions of the apparatus shown in FIGS. 1 and 2, the piston and cylinder feed apparatus 22 is replaced by a feed apparatus of a type including a feeding screw or a pressure bag.

FIG. 3 shows another sausage-making apparatus. This apparatus has a support frame 40 on which a cooking tube 42 is supported. The frame 40 may stand on the floor on legs 43. The tube 42 has dimensions similar to those of the tube 10 of the apparatus of FIGS. 1 and 2. The tube is rigid and made of stainless steel but could otherwise be of glass (particularly for use with a microwave heating source). When the tube is of stainless steel, its interior could be coated with PTFE to reduce friction. The tube 42 is surrounded over most of its length by a jacket 44 having an inlet 45 and an outlet 46 for a countercurrent of heating oil at about 120° supplied through a pipeline (not shown) from a heated tank 47 by a pump 49. The outlet 46 is connected by a pipeline (not shown) to the tank 47 so that oil is returned to the tank after having heated the tube portion inside the jacket 44. In a modified apparatus, the inlet 45 and outlet 46 of the jacket are interchanged and the sausages and heating oil flow in the same direction.

In a modified version of this apparatus, the heating jacket 44 surrounds only an upstream portion of the tube 42 and the remaining downstream portion is surrounded by another jacket through which cooled water at about 3° C. is fed to cool the sausages cooked in the heated tube portion. In a further modified version, the tube 42 has an intermediate jacket heated to a temperature of between 3° C. and 120° C. In further modifications, there are more than three temperature-control portions. For example, the heating, intermediate and cooling portions mentioned may be preceded by a pre-heating stage at a temperature below 20° C. The feed apparatus may also include a static mixer, either aligned with or separate from the tube 10, to ensure complete homogeneity of the sausage-meat before cooking.

Through the tube 42 a metallic wire 48 extends. The wire 48 carries a plurality of stainless steel cups 50 which act to partition the interior of the tube into sausage-shaped compartments 52. The wire 48 is secured in a bore 54 in each cup 50 by any suitable means. One of the cups 50 is shown in more detail in FIG. 4 and it will be seen from here that the cups have a circular cylindrical outer surface 52 of diameter such that the cup is a close fit in the interior of the tube 42. Both circular end faces 53 of each cup 50 are concave have a somewhat flattened hemispherical shape corresponding to the end of a sausage. The cups may also have radial grooves for simulating the appearance of a twisted sausage skin. The spacing between the cups 50 on the wire 48 is such that the distance between adjacent cups is equal to the length of the sausages to be manufactured.

The ends of the wire 48 are joined together to form an endless loop. This can be done, for example, by having a special half-cup at each end of the unjoined wire, the special half-cups having co-operating screw threads enabling the two halves to be secured to each other. The endless loop of wire 48 is passed around a drive sprocket 54 adjacent the outlet end of the tube 42 and a guide sprocket 56 adjacent the inlet end of the tube. The drive sprocket is driven by an electric motor 57 by a chain 58. A friction clutch 55 and a variable ratio gearbox 59 are positioned between the motor 57 and the drive sprocket of the chain 58.

The drive sprocket 54 for the wire 48 and cups 50, together with the output end of the tube 42, is shown in more detail in FIG. 5. The periphery of the sprocket 54 has a plurality of indented portions 60 which are slightly greater in length than the cups 50. Three such portions are shown in FIG. 5 which is not to scale: in practice six or eight portions are provided. The raised portions of the sprocket between the indented portions each have a central groove 61 in which the wire 48 can be received. As can be seen from FIG. 5, the cups 50 are engaged in the indented sprocket portions 60 and the portion of the wire 48 between successive cups 50 is received in the groove 61. This engagement of the wire and cups with the sprocket not only drives the wire and cups through the tube 42, to move the sausage compartments 62 therethrough, but can also assist in displacing cooked sausages 64 from the wire.

A sausage-meat feeding apparatus 64 is positioned adjacent the inlet end of the tube 42. The apparatus includes an upstream extension tube 65 connected to the sausage-forming tube 42. The wire 48 and cups 50 pass through the extension tube which has a lateral opening which is in communication with an annular sleeve surrounding the extension tube 45 and itself connected to the output of a piston and cylinder arrangement which feeds sausage meat into the spaces between successive cups 50 as they pass through the extension tube.

FIGS. 6 and 7 of the drawings show a modified arrangement in which cups 70 are attached to a pair of wires 72 by means of circlips 74 secured to the wires and seated in peripheral grooves 76 of the cups 70. Further, longitudinal grooves 78 receive the wires 72.

In the apparatus of FIGS. 3 to 5 and of FIGS. 6 and 7, the wire 48 or wires 72 may be replaced by steel bands or ribbons.

FIG. 8 of the drawings shows a flexible belt 90 with upstanding formations 92. The belt replaces the wire and cups of the apparatus of FIGS. 3 to 7 in a further apparatus embodying the present invention. The belt 90 is of a suitable flexible plastics material and has a width equal to the internal circumference of the cooking tube of the sausage-making apparatus. At intervals along the belt 90 equal to the length of the sausages to be formed, transverse rows of generally-pyramidal elements 92 are attached to the belt. The elements 92 are shaped such that, when the belt 90 is rolled inside the sausage-forming tube into a cylinder with the elements on the interior curved surface of the cylinder, the elements 92 co-operate to form a partition within the rolled belt. The elements 92 are, moreover, shaped such that the faces of the partition are of a concave shape which corresponds to the end shape of the sausages to be produced.

Figure 9:
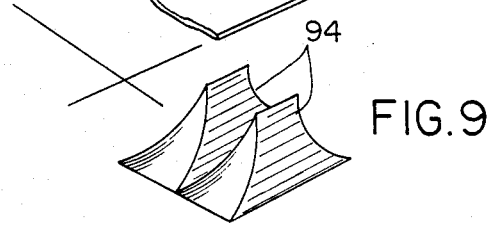
FIG. 9 is a perspective view of a portion of a belt which is a modified version of the belt of FIG. 8.

FIG. 9 of the drawings shows a modified form of partition-forming element 94 which has a greater longitudinal extent than the elements 92. The elements 94 are attached to a flexible belt in the same manner as the elements 92 but co-operate to form a partition of greater thickness than do the elements 92.

Figure 10:
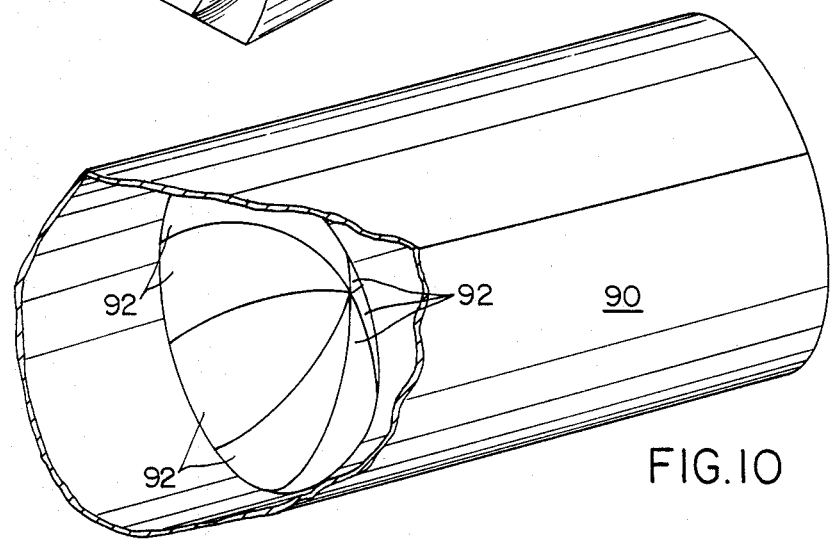
FIG. 10 shows a portion of the belt of FIG. 8 in a rolled-up configuration.
Figure 11:
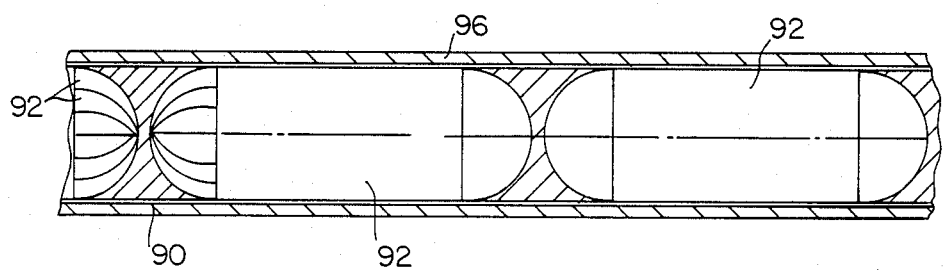
FIG. 11 is a longitudinal section through a portion of the apparatus of FIG. 8.

FIG. 10 of the drawings shows the belt of FIG. 8 as it is rolled within the sausage tube of the sausage-manufacturing apparatus and it can be seen that the elements 92 co-operate to form a partition of desired shape. FIG. 11 shows the sausage tube 96 of the apparatus partitioned into sausage-shaped compartments 98.

The apparatus which incorporates one of the belts of FIGS. 8 to 11 is similar to that shown in FIGS. 3 to 7 except that the sprockets 54, 56 are replaced by suitable friction drive wheels engaged on the flat surface of the belt 90. A suitable shoe may be included to assist in un-rolling of the belt and release of the cooked sausages.

All the forms of apparatus described are suitable for use on a commercial manufacturing scale since a required output of sausages can be obtained by using an appropriate number of sausage tubes in parallel. With such an arrangement, the drive means of the tubes can be driven by a common motor with appropriate clutches between the tubes for disconnection of individual tubes and, moreover, the sausage meat feeding, heating medium supply, cooling medium supply and collection of cooked sausages can be common to the plurality of tubes.

It is evident that those skilled in the art may make numerous modifications of the specific embodiments described above without departing from the present inventive concepts. For example, it is within the scope of the invention disclosed to transfer and interchange features of the embodiments described between the embodiments. It is accordingly intended that the invention shall be construed as embracing each and every novel feature and novel combination of features present in or possessed by the apparatus herein described and that the foregoing disclosure shall be read as illustrative and not limiting except to the extent set forth in the claims appended hereto.

I claim:

1. An apparatus for the processing of a food product-forming material, comprising a flexible-walled tube in which the material is processed, means for forming in an end-to-end arrangement in the tube a plurality of spaced-apart longitudinally-extending zones to be occupied by the material and for moving material occupying the zones successively from an inlet of the tube to an outlet, and means for introducing the material into the zones adjacent the inlet of the tube, the forming and moving means comprising respective series of pressure elements on opposed sides of the tube, the pressure elements acting in pairs to pinch the tube walls together and form the zones within the tube, and the pressure elements being movable along the tube in order to move sausage or other food material in the zones along the tube by peristaltic action.

2. An apparatus for the processing of a food product-forming material, comprising a tube in which the material is processed, spaced-apart partitioning means dividing the interior of the tube into a plurality of elongate compartments which extend axially of the tube in end-to-end relationship one with another and are bounded at least in part by the inner surface of the wall of said tube, the partitioning means being mounted at spaced intervals along an elongate element which extends internally of the tube adjacent said inner surface of said wall of said tube so that substantially no part of any elongate compartment lies between said elongate element and said adjacent inner surface of said wall, means for introducing the material into the tube adjacent an inlet thereof and drive means for driving the elongate element and partitioning means through the tube.

3. An apparatus according to claim 2, in which the drive means comprise a sprocket driven by motor means and shaped to engage the partitioning means.

4. An apparatus according to claim 3, in which the periphery of the sprocket has a plurality of recesses into which respective partitioning means are received for engagement with the sprocket.

5. An apparatus according to claim 4, in which peripheral portions of the sprocket between the recesses have slots for reception of the elongate element.

6. An apparatus according to claim 2, in which the walls of the tube are rigid.

7. An apparatus according to claim 2, in which the elongate element is endless.

8. An apparatus according to claim 7, in which the elongate element is a wire or tape carrying a plurality of partitioning elements, each shaped in cross-section to correspond to the internal cross-section of the tube and having end faces which are shaped to correspond to the desired end shapes of the food products.

9. An apparatus according to claim 8, in which the end faces of the elements are concave and shaped to correspond to the end shapes of sausages.

10. An apparatus according to claim 9, in which the end faces also have a set of approximately-radial grooves which give the appearance of a twisted sausage skin in a skinless sausage produced by the apparatus.

11. An apparatus according to claim 2, in which the means for introducing food material includes a mixing device.

12. An apparatus according to claim 2, in which the elongate element extends through a tubular portion of a pressurised feed system forming an extension of the tube and having a side-entry through which the food material is introduced into the compartments.

13. An apparatus according to claim 12, in which the pressure feed system is pulsed so that pressure is applied only when the food product zones or compartments are in register with the feed system outlet.

14. An apparatus according to claim 7, in which a return run of the endless element passes through a cleaning chamber containing cleaning and/or sterilising means.

15. An apparatus according to claim 14, in which the cleaning and/or sterilising means comprise a device for spraying cleaning and/or sterilising liquids onto the endless element and partitioning means.

16. An apparatus according to claim 14, in which the cleaning and/or sterilising means comprise means for immersion of the endless element and partitioning means in a cleaning and/or sterilising liquid.

17. An apparatus for procesing a food product-forming material, comprising:
a tube in which said material is processed,
an elongate element received within said tube,
spaced-apart partitioning means mounted on said elongate elemnt which extends internally of the tube adjacent the interior surface of said wall of said tube so that substantially no part of any elongate compartment lies between said elongate element and said adjacent inner surface of said tube wall, and
drive means for driving said elongate element and said partitioning means through said tube,
said tube having an inlet and an outlet and said partitioning means forming in said tube a series of zones which extend longitudinally of said tube and are bounded at least in part by the inner surface of said wall of said tube,
said apparatus including
means for introducing said material into said zones adjacent said inlet of said tube,
said material introduced into said zones being movable from said inlet to said outlet of said tube by said drive means.

18. An apparatus according to claim 17, including means for heating said material received in said tube.

19. An apparatus according to claim 18, in which said heating means comprise means for heating the contents of an upstream portion of said tube.

20. An apparatus according to claim 17, including means for cooling material received in said tube.

21. An apparatus for manufacture of skinless sausages, comprising
a flexible-walled tube in which said sausages are formed, said tube having an inlet and an outlet,
means for forming within said tube a plurality of elongate sausage compartments and for moving said compartments successively from said inlet of said tube to said outlet thereof, and
means for introducing sausage material into said compartments adjacent said inlet of said tube,
said compartments extending axially of said tube, being spaced-apart longitudinally of said tube and being bounded at least in part by the inner surface of the wall of said tube, and
said means for forming and moving said compartments comprising respective series of pressure elements on opposed sides of said tube,
said pressure elements acting in pairs to pinch said tube walls together to form said sausage compartments and being movable along said tube to move sausage material in said compartments along said tube by peristaltic action.

22. An apparatus according to claim 21, including means for heating sausage material in at least an upstream portion of said tube in order to cook sausage material therein.

23. An apparatus according to claim 22, including means for cooling the contents of a downstream portion of said tube.

24. An apparatus according to claim 23, including means for bringing the contents of an intermediate tube portion between said upstream and downstream portions to an intermediate temperature.

25. An apparatus according to claim 21, in which each series of pressure elements acting on said tube is formed by a run of a respective endless member carrying said pressure elements and in engagement with drive means for driving said elements along said tube.

26. An apparatus according to claim 25, in which said endless member comprises a chain.

27. An apparatus according to claim 25, in which said endless member comprises a belt.

28. An apparatus according to claim 22, in which said heated portion of said tube and the corresponding ones of said pressure elements are enclosed in a chamber having inlet and outlet ports by way of which steam for heating said tube portion can be fed.

29. An apparatus for processing of a food product-forming material, comprising,
a tube in which said material is processed, said tube having an inlet and an outlet,
means for forming in said tube a plurality of zones to be occupied by said material, said zones being spaced longitudinally of said tube, and for moving material occupying said zones successively from said inlet to said outlet of said tube, and
means for introducing said material into said zones adjacent said inlet of said tube,
said means for forming and moving said food material zones comprising a source of compressed gas which is arranged to introduce pockets of pressurized gas into said tube alternately with said food-product forming material introduced by said material-introduction means, thereby to drive foodproduct forming material along said tube to said tube outlet by expansion of said pressurized gas introduced into said tube.

30. An apparatus for processing a food product-forming material, comprising,
a tube in which the material is processed, said tube having inlet means and outlet means,
zone-defining means extending lengthwise of said tube and being interconnected longitudinally thereof, said zone-defining means comprising zone-defining elements spaced longitudinally of said tube and means interconnecting said elements, said zone-defining means being arranged to form in said tube a plurality of zones which are spaced-apart lengthwise of said tube, are bounded at least in part by the inner surface of the wall of said tube and have cross-sections transverse to the longitudinal extent of said tube which are substantially uninterrupted by said zone-defining means,
means for introducing said material into said zones through said inlet means, and
means for moving said zone-defining means along said tube thereby to move said material occupying said zones along said tube from said inlet means to said outlet means of said tube.

31. An apparatus according to claim 30, including means for heating said food product material when occupying at least an upstream portion of said tube.

32. An apparatus according to claim 31, including means for cooling said food product material when occupying a downstream portion of said tube.

33. An apparatus according to claim 32, including means for bringing an intermediate portion of said tube between said upstream and downstream portions to a temperature intermediate the respective temperatures of said upstream and downstream portions.

34. An apparatus according to claim 30, in which said tube is a flexible-walled tube,
said zone-defining means comprise first and second series of pressure elements acting on respective first and second opposite sides of said tube, said elements of said first series being arranged with said elements of said second series so that said elements act in pairs to pinch said tube wall together and thereby form said zones therein, and
said moving means comprise first and second elongate support members extending along said first and second sides of said tube and carrying said first and said second series of pressure elements respectively, said elongate support members each being movable longitudinally of said tube thereby to move said zones therealong.

35. An apparatus according to claim 34, in which each elongate support member comprises an endless member and said moving means comprise drive means engaging said endless members in order to move said endless members longitudinally of said tube.

36. An apparatus according to claim 34, including means for heating said food product material when occupying at least an upstream portion of said tube, and in which said elongate support members and their said pressure elements acting on said heatable portion of said tube are enclosed in a chamber having inlet and outlet ports through which steam for heating said heatable tube portions can be passed.

37. An apparatus according to claim 30, in which
said zone-defining means comprise an elongate support element having mounted thereon spaced-apart partitioning means, said elongate support element being receivable within said tube when said partitioning is used to define said series of zones inside said tube, and
said moving means comprise drive means for driving said elongate support element and said partitioning means through said tube.

38. An apparatus according to claim 37, in which said drive means comprise a sprocket driven by motor means and shaped to engage said partitioning means.

39. An apparatus according to claim 38, in which the periphery of said sprocket has a plurality of recesses into which respective partitioning means are received for engagement with said sprocket.

40. An apparatus according to claim 39, in which peripheral portions of said sprocket between said recesses have slots for reception of said elongate output element.

41. An apparatus according to claim 30, in which said tube is a rigid-walled tube.

42. An apparatus according to claim 37, in which said elongate support element is endless.

43. An apparatus according to claim 42, in which said elongate support element comprises a wire.

44. An apparatus according to claim 42, in which said elongate support element comprises a tape.

45. An apparatus according to claim 37, in which each of said partitioning elements has end faces which are concave to correspond to the end shapes of sausages.

46. An apparatus according to claim 45, in which said end faces also have a set of approximately-radial grooves which give the appearance of a twisted sausage skin in a skinless sausage produced by the apparatus.

47. An apparatus according to claim 30, in which said material-introducing means includes means for mixing said material prior to introduction into said tube.

48. An apparatus according to claim 34, in which said material-introducing means comprises a pressurized feed system having a tubular portion forming an extension of said tube and having a said-entry through which said material is introduced into said tube and said elongate support element extends through said tubular portion.

49. An apparatus according to claim 48, in which said pressure feed system is pulsed so that pressure is applied by said feed system only when said zones defined between said partitioning means are in register with said side entry.

50. An apparatus according to claim 42, including a chamber containing means for carrying out at least a cleaning or sterilizing function and in which a return run of said endless support element passes through said chamber.

51. An apparatus according to claim 50, in which the cleaning/sterilizing means comprise a device for spraying liquids onto said endless support element and partitioning means.

52. An apparatus according to claim 50, in which the cleaning/sterilizing means comprise means for immersion of said endless support element and partitioning means in liquid.

* * * * *